Feb. 17, 1931. H. L. TANNER 1,793,262
BEARING FOR SHAFTS AND LUBRICATION THEREOF
Original Filed June 14, 1921
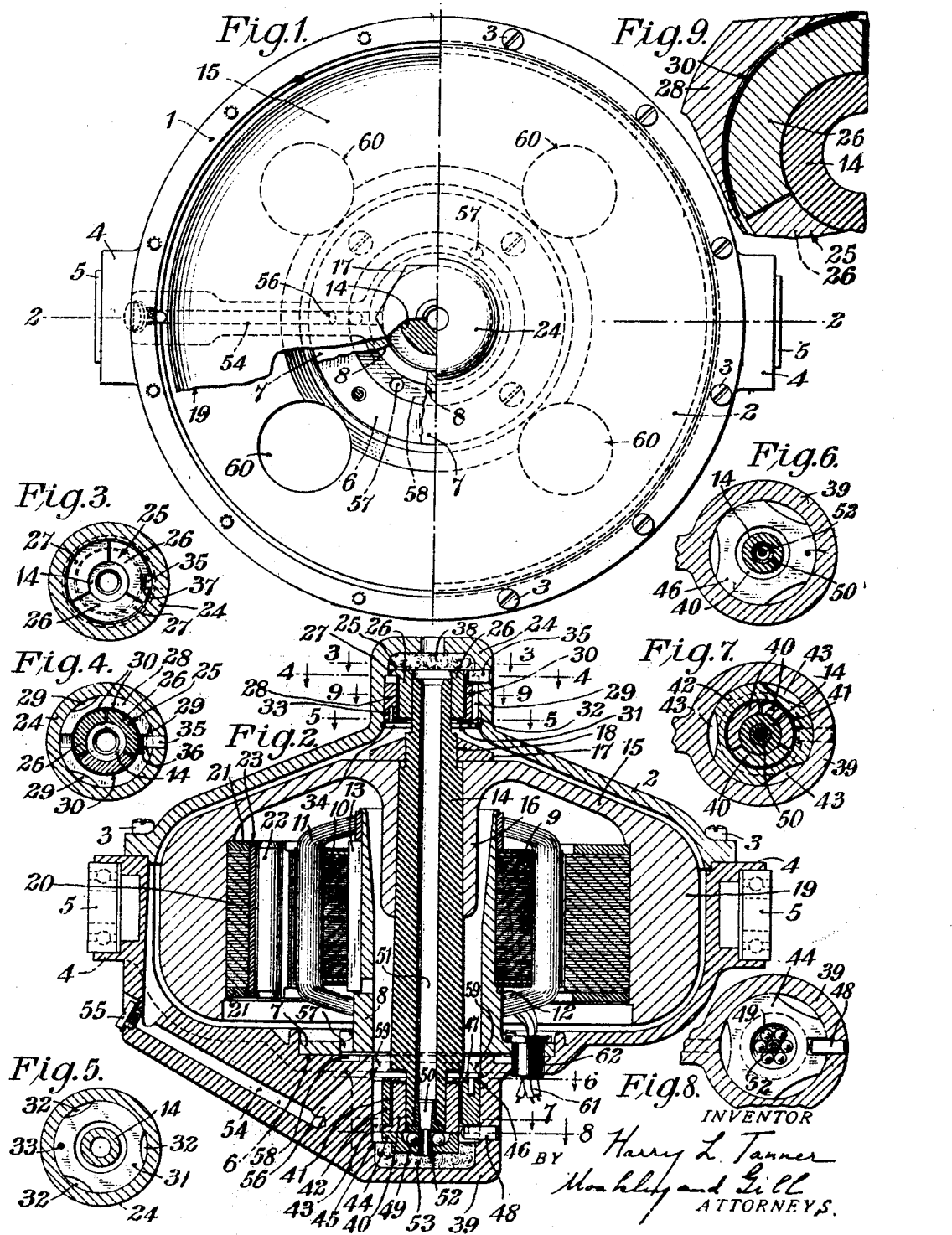

Patented Feb. 17, 1931

1,793,262

UNITED STATES PATENT OFFICE

HARRY L. TANNER, OF BROOKLYN, NEW YORK, ASSIGNOR TO FORD INSTRUMENT COMPANY, INC., OF NEW YORK, N. Y., A CORPORATION OF NEW YORK

BEARING FOR SHAFTS AND LUBRICATION THEREOF

Application filed June 14, 1921, Serial No. 477,432. Renewed April 24, 1928.

This invention relates to bearings for shafts of rotating bodies and the lubrication thereof, and particularly to bearings for vertical or inclined shafts which are liable to chatter when running and the upper bearings of which are difficult to lubricate due to the tendency of the lubricant to flow from them.

For the purpose of illustration the invention will be shown and described in connection with a gyroscope arranged to spin about a substantially vertical axis, although it will be understood that it is equally applicable to any other kind of apparatus which includes an element adapted to rotate about a vertical or inclined axis.

Gyroscopes as commonly constructed consist of a case within which is a rotatable mass, usually the rotor of an induction motor. On account of the limited space within the case and the speed of the rotor, the matter of properly supporting and aligning the shaft of the rotor as well as lubricating its bearings is attended by many difficulties, and particularly is this the case if the spinning axis of the gyroscope is arranged vertically or inclined as in such cases difficulty is frequently experienced in maintaining a sufficient supply of lubricant at the upper bearing of the shaft.

The present invention has for one of its objects the provision of bearings for the upper and lower ends of the shaft of a revolving body, which will prevent chattering of the shaft within the bearings and avoid strains in the shaft and the parts mounted thereon upon variations in alignment of the shaft.

A further object of the invention is the provision of an arrangement whereby lubricant may be forced from the lower end of the shaft through the shaft to its upper bearing, thus obviating the use of external arrangements for conveying the lubricant from the lower portions of the apparatus, to which it tends to flow by gravity, to the upper bearing.

These objects of the invention together with others which will hereinafter appear are attained by providing for the lower end of the shaft of a rotating body a ball bearing which carries the weight of the shaft and the parts mounted thereon, together with an aligning bearing consisting of a number of separate segments held against the shaft by resilient members which will take up the wear of the shaft and bearing and yield slightly if the shaft tends to deviate from its true position, thus preventing strains in the shaft. A similar aligning bearing is provided for the upper end of the shaft.

In order that lubricant may be conveyed through the shaft from the bottom of the apparatus to the upper bearing, the shaft is provided with a bore at the lower end of which is a hollow tapering member into which the lubricant flows by gravity and from which it is forced through the bore by the effect of centrifugal force throwing the lubricant against the upwardly diverging inner face of the member. When the lubricant reaches the top of the bore it flows over the upper end of the shaft into the upper bearing and after passing through the latter returns to the bottom of the apparatus to lubricate the lower bearing or be conveyed again to the upper bearing.

In case the rotating body is mounted within a casing which requires ventilation as in a gyroscope, there is provided, in addition to the above features of the invention, ventilating means consisting of a plurality of ports in the lower portion of the casing, these ports being so arranged that air is drawn through the inner portion of each port and expelled through the outer portion of an adjacent port by the rotation of the body within the casing.

The particular nature of the invention as well as other objects and advantages thereof will appear more clearly from a description of a preferred embodiment, and as stated above a gyroscope has been selected for purpose of illustration and is shown in the accompanying drawings in which Fig. 1 is a plan view of the gyroscope with portions of its case and rotor cut away to show the interior arrangements, Fig. 2 is an elevation in section along the line 2—2 of Fig. 1, Figs. 3 to 8 inclusive are transverse sectional views taken along the correspondingly numbered lines of Fig. 2, and Fig. 9 is an enlarged sectional view of a portion of the upper bearing along the line 9—9 of Fig. 2.

The gyroscope comprises a case 1 and a cover 2 clamped together by screws 3, the case being provided with diametrically opposite sockets 4 adapted to receive bearings 5 by which the gyroscope may be supported. At the bottom of the case 1 is a circular recess 6 adapted to receive a flange 7 at the bottom of a tubular member 8 which serves as a support for the stator 9 of an induction motor. The stator is made up in the usual manner of a laminated core 10 and windings 11, these elements being supported upon a ledge 12 on the exterior of the member 8. A key 13 prevents the parts of the stator from turning upon the supporting member 8.

Within the supporting member 8 is a tapering shaft 14 upon the upper portion of which is mounted the wheel or rotor 15 of the gyroscope. This rotor is provided with a hub portion 16 having a bore the taper of which corresponds to that of the shaft 14. The rotor is held firmly upon the shaft by means of a nut 17 screwed upon a threaded portion 18 of the shaft. The outer annular portion 19 of the rotor is relatively thick in order to give the required mass to the rotating member of the gyroscope. This portion of the rotor is provided with a cylindrical inner face within which are mounted the parts constituting the electrical and magnetic elements of the rotor and consisting of a series of iron laminations 20 clamped between end rings 21 of conducting material by any suitable means. The end rings and the laminations are provided at their inner edges with a plurality of apertures within which are placed the conductors or bars of the rotor, each of which consists of a cylindrical member 22 of good conducting material, such as copper, surrounded by a tubular member 23 of magnetic material having a comparatively high resistance, such as iron. The rotor forms the subject matter of my copending application Serial No. 477,431, filed June 14, 1921, and therefore will not be further described herein.

As shown most clearly in Fig. 2, the top of the cover is provided with a housing 24, forming a cylindrical chamber within which the upper bearing for the shaft 14 is located, the details of which are shown in Figs. 2 to 5 inclusive and 9.

Surrounding the upper end of shaft 14 is a bearing 25 consisting of a plurality of parts 26 preferably formed by slitting the bearing longitudinally before putting it in place. At the top of each of the parts 26 is a projection 27 which, when the parts are in place, forms with the projections of the other parts an annular shoulder at the top of the bearing. Surrounding the parts 26 but spaced slightly therefrom is a member 28 fitted within the cylindrical chamber formed in the housing 24 but provided with channels 29 extending lengthwise along its outer face in order to provide passageways through which lubricant may flow when supplied to the apparatus through a hole in the top of the housing 24.

The annular space between the outer face of the parts 26 of the bearing and the inner face of the members 28 contains a number of curved members 30 formed of resilient material and each subtending an angle substantially equal to that subtended by each one of the parts 26 of the bearing, as shown most clearly in Fig. 9. The curvature of these members differs slightly from that of the annular space within which they are placed so that the central portions of the members lie in contact with the outer faces of the corresponding parts 26 of the bearing while their edge portions lie in contact with the inner face of the member 28 as shown most clearly in Fig. 9. By virtue of this construction there is provided a spring arrangement for holding the bearing 25 in central position with respect to the member 28 but which will yield slightly upon changes in the alignment of the shaft.

To prevent any possibility of the resilient members 30 dropping out of the space within which they are placed, there is attached to the bottom of the member 28 a washer 31 having notches 32 in its edge adapted to register with the channels 29 in the outer face of this member. To keep the notches in alinement with the channels the washer is connected to the member 28 by a pin 33.

The parts described above are held in place within the housing 24 by a divided spring ring 34 fitted within a recess at the bottom of the inner wall of the housing. In order to prevent the bearing 25 and the member 28 from turning there is provided a pin 35 which extends through the wall of the housing 24 and through a groove 36 in the top of member 28 into a notch 37 cut in the shoulder 27 of one of the parts 26 of the bearing. The space between the top of the bearing 25 and the inner face of the housing 24 is filled with suitable packing material 38 which prevents upward movement of the bearing, acts as a filter for lubricant supplied to the apparatus through the hole in the top of the housing and retains lubricant for the upper bearing while the motor is coming up to speed.

The bottom of the case 1 is provided with a housing 39 within which is mounted the bearing for the lower end of the shaft 14. As shown most clearly in Figs. 2 and 6 to 8 inclusive, the portion of this bearing which holds the shaft in alignment is of substantially the same construction as is the upper bearing but its parts are reversed. It consists of a split bearing 40 the parts of which are pressed against the lower end of the shaft 14 by spring members 41 placed between the bearing and a surrounding member 42 provided with channels 43 in its outer face, these parts being substantially the same as the corresponding parts of the upper bearing. The bearing 40 and the member 42 are seated upon a plate 44 resting upon a shoulder 45 formed in the cylindrical inner face of the housing 39. The plate is provided with notches at its outer edge registering with the channels 43 in the member 42. At the top of the bearing is a washer 46 and a retaining ring 47 similar to the corresponding parts of the upper bearing but serving the purpose of holding the parts upon the plate 44. The parts of the lower bearing are prevented from turning by means of a pin 48 extending through a groove in the lower face of the member 42 into a notch in the shoulder of one of the parts of the bearing 40 in the same manner as in the upper bearing.

The central portion of the plate 44 is provided with a depression adapted to receive balls 49 for carrying the weight of the shaft 14 and the rotor mounted thereon. The lower end of the shaft does not directly engage the balls, but is provided with a member 50 constructed of suitable material to cooperate with the balls with a minimum amount of wear and set within a bore 51 extending through the shaft 14.

The member 50 is also utilized as a pump for forcing lubricant through the bore 51 to the upper bearing. For this purpose it is provided with an upwardly diverging bore whereby under the influence of centrifugal force the lubricant will be propelled upwardly along the inner face of this member and then forced along the face of the bore in the shaft until it flows out at the upper end of the shaft. In order to supply the lubricant to the member 50 there is inserted in the plate 44 a nipple 52 the outer face of which also serves to hold the balls 49 in proper relation to the member 50. The space between the plate 44 and the bottom of the housing 39 is filled with suitable packing material 53 which acts as a filter for the lubricant which flows into the nipple 52.

After the lubricant has been forced to the upper bearing of the apparatus, it will flow through this bearing and run back to the bottom of the case over the outside of the rotor and along the inside of the cover 2 and case 1. In order to provide a passage for lubricant to drain back to the lower bearing the case is provided with a rib within which is formed a conduit 54 closed by a cap 55 and having a branch conduit 56 extending to the upper part of the housing 39. In order to permit any lubricant which may collect around the base of the supporting member 8 to drain into the lower bearing, the flange 7 is provided with apertures 57 which communicate with an annular channel 58 formed in the case 1 immediately below the member 8. A number of passageways 59 are provided between the channel 58 and the interior of the housing 39 to permit lubricant to flow from the former into the latter and thus reach the lower bearing.

In order to ventilate the gyroscope, the case 1 is provided at its bottom with a number of circular ports 60 of suitable size to permit air to be drawn in at the inner portion of each port and be discharged at the outer portion of an adjacent port by the rotation of the rotor.

In the operation of the gyroscope described above the stator will be supplied with suitable polyphase current over leads 61 which may be carried through a suitable insulating bushing 62 extending through the flange 7 and the wall of the case 1. The housing 39 will be filled with lubricant for the lower bearing of the shaft and some of this lubricant will flow through the nipple 52 into the tapering member 50. As the rotor spins the lubricant will be thrown against the inner sloping face of this member and be forced upwardly. The pressure thus imparted to the lubricant will be sufficient to pump it through the bore of the shaft to the upper bearing, after which it will return to the lower bearing through the case and the drain conduits 54, 56, 57, and 59.

Since both the upper bearing 25 and the lower bearing 40 are composed of a number of parts pressed against the ends of the shaft by the resilient members 30 and 41, the wear of the shaft and the bearings will be taken up by inward movement of these parts. The resilient members should be so designed as to press the parts of the bearings against the shaft with sufficient force to prevent chattering of the shaft, without interfering with the free rotation of the shaft within its bearings. The resilient members will also allow the ends of the shaft to move slightly upon variations in the alignment of the shaft as the rotor spins, without causing strains in the shaft and the parts mounted thereon as would be the case were the bearings rigidly mounted in the case and cover of the apparatus.

The construction is also such that the several parts of both bearings may be conveniently removed or assembled, but will be held securely in place against possible dislodgment when the gyroscope is in operation.

While the several features of the invention have been shown and described in connection with a particular form of rotating body, i. e., a gyroscope, it will be understood that they may be applied equally well to other types of apparatus, particularly those provided with moving elements adapted to rotate rapidly about vertically disposed axes. It will also be understood that various changes may be made in the details of the apparatus without departing from the principle of the invention as defined in the appended claims wherein the term "vertically disposed" or similar references to the position of a shaft are to be considered as including shafts that are inclined as well as those that are truly vertical.

I claim—

1. In apparatus of the character described, a vertically disposed shaft provided with a bore, a ball bearing and an alining bearing for the lower end of the shaft, an alining bearing for the upper end of the shaft, and means at the lower end of the shaft for pumping lubricant through the bore to lubricate the bearing at the upper end of the shaft, said means being formed to co-operate with the balls in carrying the weight of the shaft and the parts mounted thereon.

2. In a gyroscope adapted to spin about a vertically disposed axis, a casing provided at top and bottom with housings, a member mounted in the lower housing, balls within the member, a shaft extending between the housings and provided with a bore, an alining bearing for each end of the shaft, and means at the lower end of the shaft for engaging the balls, said means being provided with an upwardly diverging bore coaxial with the bore in the shaft whereby lubricant may be pumped into and through the shaft to the upper bearing by centrifugal force.

3. In apparatus including a vertically disposed shaft, bearings for the ends of the shaft each composed of a plurality of segments and provided with lubricant passages, means associated with each segment for pressing it against the shaft, and means effecting the travel of lubricant in reverse directions to the bearings at opposite ends of said shaft.

4. In apparatus including a vertically disposed shaft, bearings for the ends of the shaft each composed of a plurality of segments and provided with lubricant passages, resilient means associated with each segment for pressing it against the shaft, and means effecting a circulation of lubricant longitudinally of said shaft to and from the bearings at opposite ends thereof.

5. In apparatus including a vertically disposed shaft, bearings for the ends of the shaft each composed of a plurality of segments having lubricant passages therebetween, a member surrounding the segments of each bearing but spaced therefrom and a resilient member associated with each segment and lying in the space between it and the surrounding member for pressing the segment against the shaft, said surrounding members having lubricant passages.

6. In apparatus including a vertically disposed shaft, bearings for the ends of the shaft each composed of a plurality of segments, a member surrounding the segments of each bearing but spaced therefrom and provided with a lubricant passage-way, resilient members between the segments and said surrounding member, and means attached to the surrounding member for preventing displacement of the resilient members.

7. In apparatus including a vertically disposed shaft, cylindrical bearings for the ends of the shaft provided with lubricant passageways and each being composed of a plurality of segments, a cylindrical member surrounding the segments of each bearing but spaced therefrom to form an annular chamber and a resilient member associated with each segment and lying in the annular chamber, each of said resilient members having a curvature different from that of the chamber, whereby they engage the outer face of the corresponding segment and the inner face of the cylindrical member to press the segment against the shaft.

8. In apparatus of the character described, the combination of a casing provided with housings at top and bottom, a vertically disposed shaft and a lubricant passage therein extending between the housings, a bearing in each housing for the corresponding end of the shaft and in communication with the lubricant passage of the latter, each of the bearings being composed of a plurality of lubricant-passage-forming segments, a member surrounding the segments of each bearing but spaced therefrom and having a lubricant passage, a resilient member associated with each segment and lying in the space between it and the surrounding member for pressing the segment against the shaft, and means associated with each housing and the surrounding member and bearing mounted therein for preventing turning of the member and bearing.

9. A bearing for the lower end of a vertically disposed shaft comprising a plate provided with a depression, balls in the depression adapted to carry the weight of the shaft, a plurality of segments mounted upon the plate and forming lubricant passage-ways and surrounding the lower end of the shaft, a member surrounding the segments and spaced therefrom and adapted for the passage of lubricant, a resilient member associated with each segment and lying in the space between it and the surrounding member for pressing the segment against the shaft and means for holding the segments and the surrounding member against the plate.

10. In a gyroscope adapted to spin about a vertically disposed axis, a casing provided at top and bottom with housings, a shaft extending between the housings and provided with a bore, a bearing in each housing composed of a plurality of segments, means associated with each segment for pressing it against the shaft, a bearing at the lower end of the shaft for carrying the weight thereof, and means at the lower end of the shaft for forcing lubricant through the bore therein to the upper bearing.

11. In apparatus including a vertically disposed shaft, bearings for the ends of the shaft each composed of a plurality of segments forming lubricant passage-ways, a member surrounding the segments of each bearing and provided with lubricant channels along its outer face communicating with the segment-formed lubricant passage-ways, and a resilient member associated with each segment and lying between it and the surrounding member for pressing the segment against the shaft.

12. In apparatus of the character described, the combination of a circular casing provided with bearing retaining portions, bearings therein, a hollow shaft supported by said bearings affording a communicating passageway between said bearings, a fluid conducting conduit provided in the bottom of said casing leading from the interior of said casing at the region of its greatest diameter to one of said bearings, and means carried by said shaft to circulate a lubricating fluid from said one of said bearings through the hollow shaft to the other of said bearings and from thence to the fluid conducting conduit and back to said one of said bearings.

In testimony whereof I affix my signature.

HARRY L. TANNER.